United States Patent [19]
Katayama et al.

[11] Patent Number: 4,815,336
[45] Date of Patent: Mar. 28, 1989

[54] POWER TRANSFER DEVICE FOR FOUR-WHEEL DRIVE

[75] Inventors: Nobuaki Katayama; Kan Sasaki, both of Toyota, Japan

[73] Assignee: Toyota Jidosha Kabushiki Kaisha, Toyota, Japan

[21] Appl. No.: 53,861

[22] Filed: May 26, 1987

[30] Foreign Application Priority Data

May 23, 1986 [JP] Japan ................................ 61-119649

[51] Int. Cl.$^4$ ............................................. F16H 37/08
[52] U.S. Cl. ................................... 74/701; 74/710.5; 180/249
[58] Field of Search .............. 74/710.5, 711, 665 GB, 74/665 T, 674, 679, 701; 180/248, 247, 249, 250

[56] References Cited

U.S. PATENT DOCUMENTS

| 4,520,690 | 6/1985 | Dangel | 74/695 |
| 4,582,160 | 3/1986 | Weismann et al. | 74/701 X |
| 4,601,359 | 7/1986 | Weismann et al. | 74/665 GB X |
| 4,643,045 | 2/1987 | Katayama | 74/701 X |
| 4,645,029 | 2/1987 | Sasaki et al. | 74/701 X |
| 4,669,332 | 6/1987 | Katayama | 74/701 |
| 4,671,135 | 6/1987 | Dangel | 74/701 X |
| 4,697,470 | 10/1987 | Sasaki et al. | 74/701 |

FOREIGN PATENT DOCUMENTS

| 58-63523 | 4/1983 | Japan | 180/248 |
| 59-81226 | 5/1984 | Japan | 180/248 |
| 60-236839 | 11/1985 | Japan | 180/249 |
| 2093416 | 9/1982 | United Kingdom. | |
| 8404792 | 4/1984 | World Int. Prop. O. | |

Primary Examiner—Rodney H. Bonck
Assistant Examiner—Dwight G. Diehl
Attorney, Agent, or Firm—Oblon, Fisher, Spivak, McClelland & Maier

[57] ABSTRACT

A power transfer device for four-wheel drive includes a center differential of the bevel gear type arranged to split the driving power from a power transmission into two torque delivery paths respectively for front-wheel drive and rear-wheel drive, a front-drive differential of the bevel gear type arranged coaxially with the center differential at one side thereof to transfer the split driving power from a side gear of the center differential to front-wheel axles, and an output gear for rear-wheel drive arranged coaxially with the center differential at the other side thereof to transfer the split driving power from another side gear of the center differential to rear-wheel axles. In the power transfer device, a limited-slip differential in the form of a viscous coupling is assembled within a mounting case for the output gear to effect limited-slip torque proportional to the difference in rotational speed between the side gears.

3 Claims, 2 Drawing Sheets

POWER TRANSFER DEVICE FOR FOUR-WHEEL DRIVE

BACKGROUND OF THE INVENTION

1. Field of the Invention

The present invention relates to a power transfer device in combination with a power transmission for automotive vehicles, and more particularly to a power transfer device of the type which includes a limited-slip differential arranged to effect limited-slip torque proportional to the difference in rotational speed between the front and rear wheel axles.

2. Discussion of the Background

In Japanese Patent Early Publication No. 60-236839 issued on Nov. 25, 1985, there has been proposed a power transfer device which includes a center differential of the bevel gear type arranged to split the driving power from a power transmission into two torque delivery paths respectively for front-wheel drive and rear-wheel drive, a front-drive differential of the bevel gear type arranged coaxially with the center differential at one side thereof to transfer the split driving power to front or rear-wheel axles, and an output ring gear for rear-wheel drive arranged coaxially with the center differential at the other side thereof to transfer the split driving power to rear or front-wheel axles. In the power transfer device, a limited-slip differential is assembled within a mounting case for the output ring gear to effect limited slip torque proportional to the difference in rotational speed between the front and rear-wheel axles. The limited-slip torque causes an increase of the driving torque at a low speed side and a decrease of the driving torque at a high speed side. This is effective to enhance roadability of the vehicle.

In the limited-slip differential, however, a rotary element is drivingly connected to the casing of the center differential, and another rotary element is drivingly connected to one of the side gears of the center differential. Namely, the limited-slip differential is interposed between the input element of the center differential and one of the output elements of the same. In such arrangement of the limited-slip differential, the limited-slip torque is distributed from the input element of the center differential to the other output element of the same. As a result, only one half of the limited-slip torque is effective to drive the wheel axles. It is, therefore, required to assemble a large size limited-slip differential for increasing the limited-slip torque two times. This causes disadvantages in a mounting space for the limited-slip differential and in weight and cost of the same.

In Automotive Engineering, Volume 93, Number 5, Page 91, there has been proposed a power transfer device which includes a planetary gear unit adapted as the center differential in the former power transfer device described above. The planetary gear unit includes an input element in the form of a carrier and output elements respectively in the form of a sun gear and a ring gear. In the power transfer device, a limited-slip differential is interposed between the output elements. However, the arrangement of the planetary gear unit is quite different from that of the center differential in the former power transfer device. For this reason, it is impossible to adapt the arrangement of the limited-slip differential in the latter power transfer device to the former power transfer device.

SUMMARY OF THE INVENTION

It is, therefore, a primary object of the present invention to provide an improved power transfer device wherein a compact size limited-slip differential is interposed between the side gears of the center differential to transfer all the limited-slip torque to the wheel axles.

According to the present invention, the object is attained by providing a power transfer device for four-wheel drive in combination with a power transmission, which transfer device comprises a first differential of the bevel gear type arranged to split the driving power from the power transmission into two torque delivery paths respectively for front-wheel drive and rear-wheel drive, a second differential of the bevel gear type arranged coaxially with the first differential at one side thereof to transfer the split driving power from a first side gear of the first differential to front or rear-wheel axles, an output gear arranged coaxially with the first differential at the other side thereof to transfer the split driving power from a second side gear of the first differential to rear or front-wheel axles, and a limited-slip differential assembled within a mounting case for the output gear to effect limited-slip torque proportional to the difference in rotational speed between the front and rear-wheel axles, wherein the limited-slip differential includes first and second rotary elements coupled with each other for relative rotation, the first rotary element being assembled within the mounting case and connected to a first hollow shaft which is arranged to drivingly connect the second side gear of the first differential to the mounting case, and the second rotary element being mounted on a second hollow shaft which is drivingly connected at an inner end thereof to the first side gear of the first differential and extends into the interior of the mounting case through the first hollow shaft.

BRIEF DESCRIPTION OF THE DRAWINGS

Additional objects, features and advantages of the present invention will be readily appreciated from embodiment thereof when considered with reference to the accompanying drawings, in which.

DESCRIPTION OF THE PREFERRED EMBODIMENT

Figure 1:
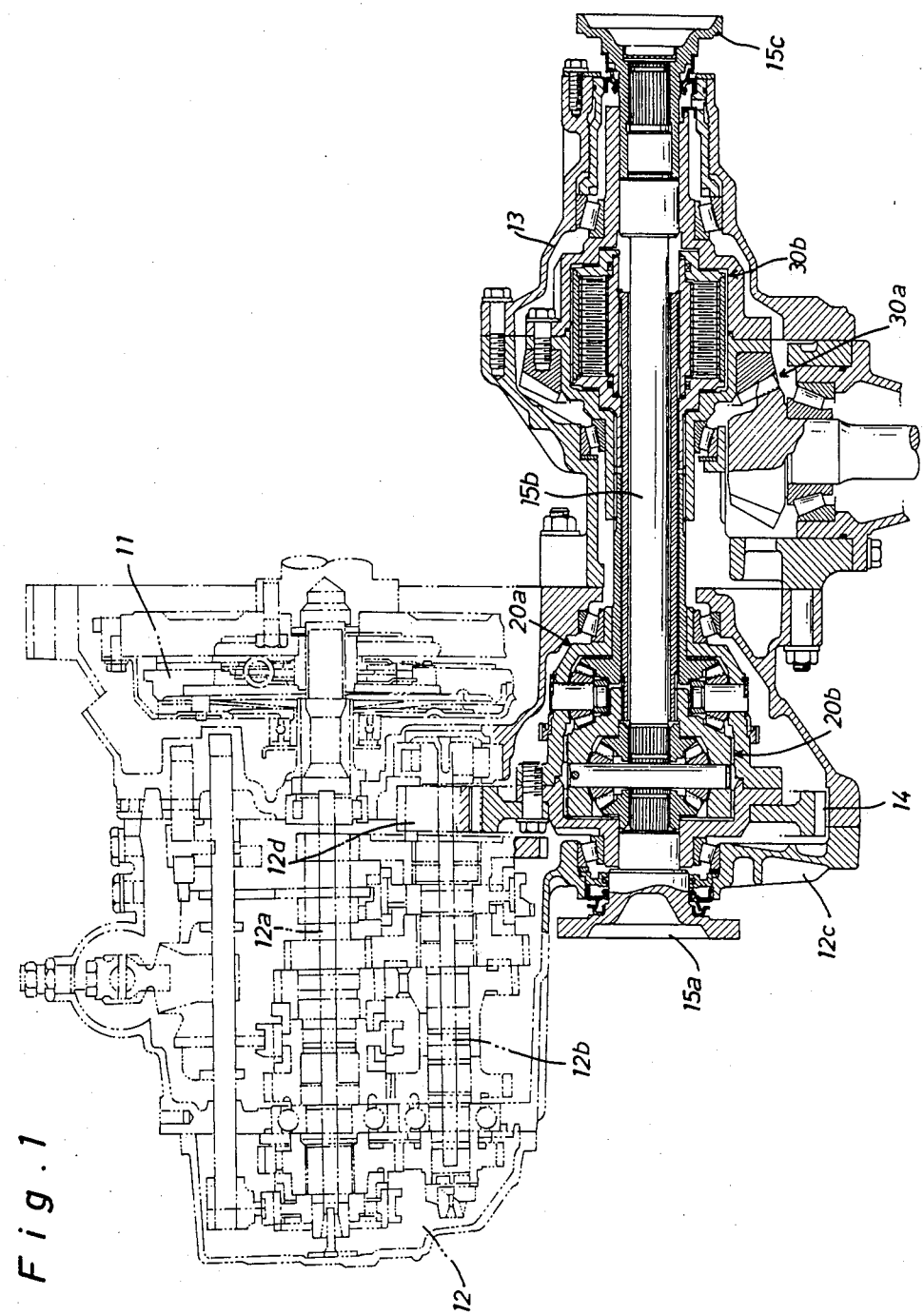
FIG. 1 is a sectional view of a power transfer device for four-wheel drive in combination with a power transmission.

Referring now to the drawings, FIG. 1 illustrates a power transfer device in accordance with the present invention which is adapted to a power transmission 12 for an automotive vehicle of the front-engine front-wheel drive type. The power transmission 12 is fixedly mounted to one side of an internal combustion engine (not shown) through a clutch mechanism 11 in a usual manner. The engine is mounted on the vehicle in such a manner that a crankshaft of the engine is transversely placed. The power transmission 12 includes a transmission casing 12c secured at one side thereof to a cylinder block of the engine, an input shaft 12a rotatably mounted within the transmission casing 12c and arranged coaxially with the crankshaft of the engine, an output shaft 12b rotatably mounted within the transmission casing 12c and arranged in parallel with the input shaft 12a, a change-speed gearing mounted on the input and output shafts 12a and 12b, and a final drive gearing including an output gear 12d mounted on the output shaft 12b for rotation therewith and arranged in mesh with an input ring gear 14 of the power transfer device.

Figure 2:
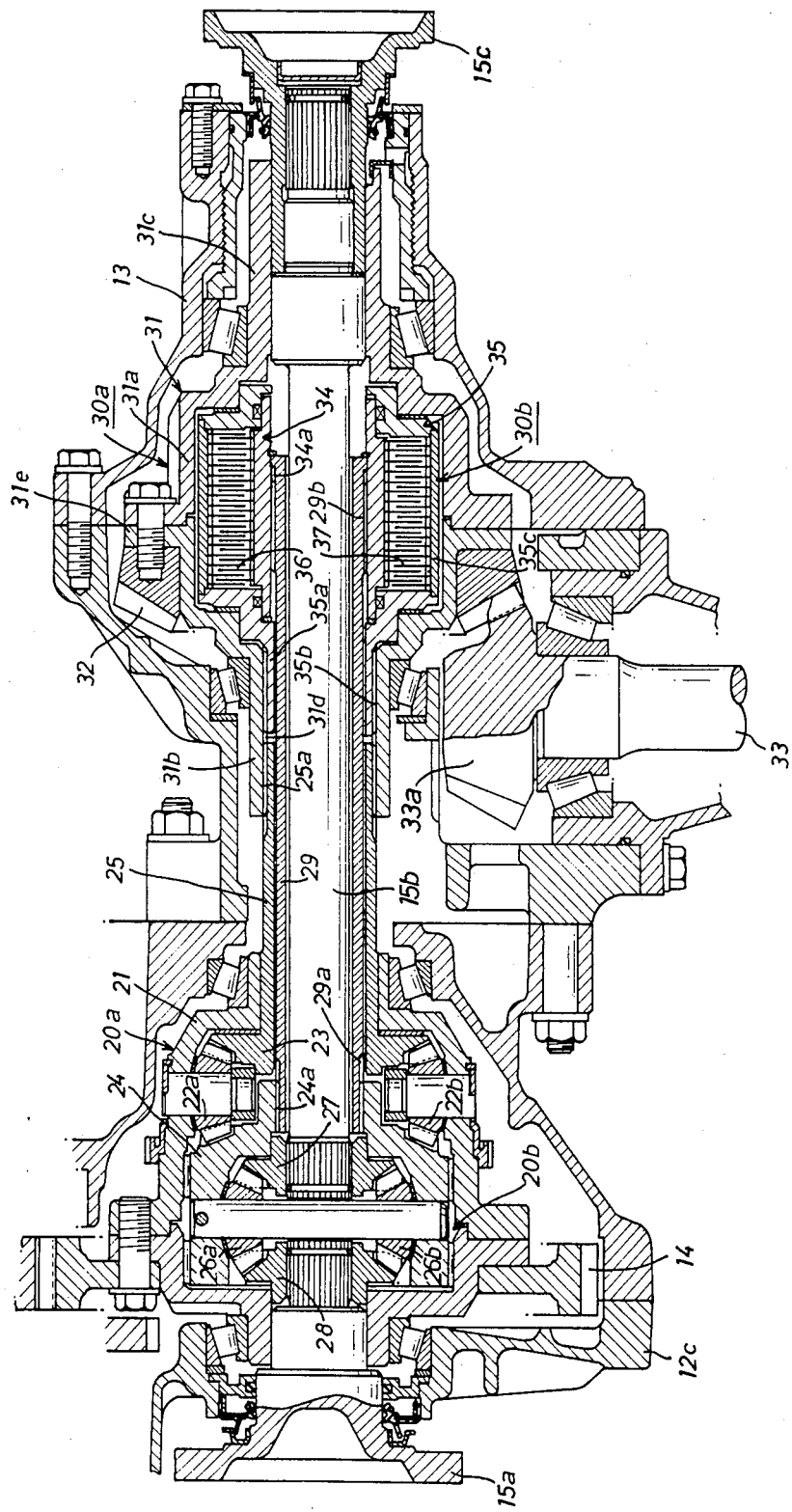
FIG. 2 is an enlarged sectional view illustrating in detail component parts of the power transfer device.

The power transfer device is contained within the transmission casing 12c and an additional housing 13 secured thereto, which device comprises a center differential 20a of the bevel gear type arranged to split the driving power from the power transmission 12 into two torque delivery paths for front-wheel drive and rear-wheel drive, a front-drive differential 20b of the bevel gear type arranged coaxially with the center differential 20a, an output gearing assembly 30a for rear-wheel drive, and a limited-slip differential 30b in the form of a viscous coupling associated with the output gearing assembly 30a. As shown clearly in FIG. 2, the center differential 20a includes an input member in the form of a differential casing 21 located within the transmission casing 12c and rotatably supported by a pair of axially spaced bearings carried on the transmission casing 12c, a pair of pinion gears 22a, 22b rotatably carried on the differential casing 21 by means of respective cross shafts, a pair of side gears 23, 24 rotatably mounted within the differential casing 21 and in mesh with the pinion gears 22a, 22b. The ring gear 14 is fixedly mounted on the differential casing 21 for rotation therewith. The right-hand side gear 23 is integrally formed with a first hollow shaft 25 which is rotatably supported by a sleeve portion of the differential casing 21 and extends from the transmission casing 12c into the interior of additional housing 13.

The front-drive differential 20b is rotatably mounted within the casing 21 of center differential 20a, which front-drive differential 20b includes an internal differential casing integral with the left-hand side gear 24 of centr differential 20a, a pair of pinion gears 26a, 26b rotatably carried on the internal differential casing 24 by means of a cross shaft, and a pair of side gears 27, 28 rotatably mounted within the internal differential casing 24 and in mesh with the pinion gears 26a, 26b. The internal differential casing 24 has a sleeve portion which extends into the central portion of differential 20a and is aligned with the first hollow shaft 25. The sleeve portion of the internal differential casing 24 is splined at 24a to a second hollow shaft 29 which extends through the first hollow shaft 25 into the interior of additional housing 13. The second hollow shaft 29 has an externally splined portion 29a in engagement with the internally splined portion 24a of the internal differential casing 24. The left-hand side gear 28 is rotatably carried on the differential casing 21 and splined to the inner end of a left-hand front-wheel axle 15a which extends outwardly in a liquid-tight manner from the transmission casing 12c. The right-hand side gear 27 is rotatably carried on the internal differential casing 24 and splined to the inner end of a right-hand front-wheel axle 15b which extends through the second hollow shaft 29 into the interior of additional housing 13 and extends outwardly in a liquid-tight manner from the additional housing 13.

The output gearing assembly 30a for rear-wheel drive includes a mounting case 31, a ring gear 32 and a drive pinion shaft 33. The mounting case 31 is arranged coaxially with the center differential 20a and in surrounding relationship with the first hollow shaft 25 and the right-hand front-wheel axle 15b. The mounting case 31 is provided with a cylindrical carrier portion 31a of increased diameter and with a pair of hollow shaft portions 31b and 31c which are rotatably supported by a pair of axially spaced bearings carried on the additional housing 13. The left-hand hollow shaft portion 31b of mounting case 31 has an internally splined portion 31d which is in engagement with an externally splined portion 25a of the first hollow shaft 25. The ring gear 32 is fixedly mounted to an annular flange portion 31e of mounting case 31 and is permanently in mesh with a drive pinion 33a of shaft 33. The drive pinion shaft 33 is rotatably mounted within the additional housing 13 in a fore-and-aft direction of the vehicle and extends rearwardly in a liquid-tight manner from the additional housing 13. The drive pinion shaft 33 is drivingly connected in a usual manner to rear-wheel axles (not shown) by way of a propeller shaft (not shown) and a final drive gearing for rear-wheel drive (not shown).

The viscous coupling 30b is arranged within the cylindrical carrier portion 31a of mounting case 31 to cause limited-slip torque under viscous resistance of silicone oil stored therein. The viscous coupling 30b includes an inner sleeve 34, a drum-like outer casing 35 coupled with the inner sleeve 34 in a liquid-tight manner for relative rotation, and a number of friction discs 36 and 37 respectively assembled with the inner sleeve 34 and the outer casing 35 for rotation therewith. The inner sleeve 34 has an internally splined portion 34a in engagement with an externally splined portion 29b formed on the right end of hollow shaft 29. The outer casing 35 has a hollow shaft portion 35a which is formed with an externally splined portion 35b in engagement with the internally splined portion 31d of mounting case 31. Formed between the inner sleeve 34 and outer casing 35 is a compartment wherein a predetermined amount of silicone oil is stored. The friction discs 36 on inner sleeve 34 are interleaved with the friction discs 37 on outer casing 35 within the compartment. In such arrangement of the viscous coupling 30b, the inner sleeve 34 is drivingly connected to the left-hand side gear 24 of center differential 20a through the second hollow shaft 29, while the outer casing 35 is drivingly connected to the right-hand side gear 23 of center differential 20a through the mounting case 31 and the first hollow shaft 25.

In operation, the driving power of the engine is applied to the input shaft 12a of power transmission 12 through the associated clutch mechanism 11 and transmitted at a selected gear ratio to the output shaft 12b by way of the change-speed gearing. In turn, the driving power from output shaft 12b is applied to the center differential 20a through the output gear 12d and ring gear 14. Thus, the center differential 20a operates to split the driving power into two torque delivery paths toward the side gears 23 and 24. The driving torque from side gear 24 is applied to the front-drive differential 20b and finally transmitted to the left and right front-wheel axles 15a and 15b through the side gears 28 and 27 of differential 20b. Simultaneously, the driving torque from side gear 23 is applied to the mounting case 31 through the first hollow shaft 25 and transmitted to the pinion shaft 33 by way of the ring gear 32 to drive the rear-wheel axles by way of the propeller shaft and the final drive gearing for rear-wheel drive.

In such operation of the power transfer device, the difference in rotational speed between the side gears 23 and 24 causes relative rotation between the inner sleeve 34 and outer casing 35 in the viscous fluid coupling 30b. This causes the viscous coupling 30b to effect limited-slip torque in accordance with the relative rotation between the inner sleeve 34 and outer casing 35. As a result, the driving torque of the front and rear-wheel axles increases at a low speed side and decreases at a high speed side. If either the front or rear road wheels skid in the mire or on a frozen road surface, the driving torque of the other road wheels will increase. This is effective to enhance roadability of the four-wheel drive vehicle.

From the above description, it will be understood that the viscous coupling 30b is interposed between the side gears 23 and 24 of center differential 20a to directly cause limited-slip torque proportional to the difference in rotational speed between the side gears 23 and 24. With such arrangement of viscous coupling 30b, all the limited-slip torque is applied to the front and rear-wheel axles. For this reason, the viscous coupling 30b can be assembled with the power transfer device in a compact size. The power transfer device is further characterized in that the first and second hollow shafts 25 and 29 are arranged to connect the outer casing 35 and inner sleeve 34 of viscous coupling 30b to the side gears 23 and 24 of center differential 20a, respectively and that the first hollow shaft 25 is utilized to connect the side gear 23 to the mounting case 31 of the output gearing assembly 30a. This is useful to provide the power transfer device substantially in the same size as that of a conventional power transfer device of this kind.

Having now fully set forth the structure and operation of a preferred embodiment of the concept underlying the present invention, various other embodiments as well as certain variations and modifications of the embodiment herein shown and described will obviously occur to those skilled in the art upon becoming familiar with said underlying concept. For example, the viscous coupling 30b may be replaced with an appropriate coupling in which two rotary elements are arranged to cause limited-slip torque during relative rotation of them. It is to be understood, therefore, that within the scope of the appended claims, the invention may be practiced otherwise than as specifically set forth herein.

What is claimed is:

1. Power transfer device for four-wheel drive in combination with a power transmission, comprising:
   a first differential of the bevel gear type arranged to split the driving power from said power transmission into two torque delivery paths respectively for front-wheel drive and rear-wheel drive;
   a second differential of the bevel gear type arranged coaxially with said first differential at one side thereof to transfer the split driving power from a first side gear of said first differential to the wheels of one of front or rear-wheel axles;
   an output gear arranged coaxially with said first differential at the other side thereof to transfer the split driving power from a second side gear of said first differential to the other of said rear or front wheel axles; and
   a limited-slip differential assembled within a mounting case for said output gear to effect limited-slip torque proportional to the difference in rotational speed between said front and rear-wheel axles;
   wherein said limited-slip differential includes first and second rotary elements coupled with each other for relative rotation, said first rotary element being assembled within said mounting case and drivingly connected to a first hollow shaft which is arranged to drivingly connect the second side gear of said first differential to said mounting case, and said second rotary element being mounted on a second hollow shaft which is drivingly connected at an inner end thereof to the first side gear of said first differential and extends to another end terminating in the interior of said mounting case, said second hollow shaft extending through said first hollow shaft, whereby torque is normally not transmitted through said second hollow shaft.

2. A power transfer device as recited in claim 1, wherein said first rotary element of said limited-slip differential is a drum-like outer casing assembled within said mounting case for rotation therewith and connected to said first hollow shaft, and said second rotary element of said limited-slip differential is an inner sleeve coupled with said outer casing for relative rotation and mounted on said second hollow shaft for rotation therewith, and wherein an amount of viscous fluid is stored in a compartment between said outer casing and said inner sleeve, and a number of friction discs on said outer casing are interleaved with friction discs on said inner sleeve in the compartment.

3. A power transfer device as recited in claim 1, wherein said second differential is assembled within a casing of said first differential and includes an internal casing integral with said first side gear of said first differential and rotatable within said casing of said first differential, a pinion gear rotatably carried on said internal casing, and a pair of side gears rotatably mounted within said internal casing and in mesh with said pinion gear, and wherein one of said side gears of said second differential is drivingly connected to an inner end of a wheel axle extending through said second hollow shaft.

* * * * *